(12) United States Patent
Chen (10) Patent No.: US 11,977,322 B2
(45) Date of Patent: May 7, 2024

(54) WAVELENGTH CONVERSION DEVICE AND PROJECTION DEVICE

(71) Applicant: Coretronic Corporation, Hsin-Chu (TW)

(72) Inventor: I-Hua Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/314,795

(22) Filed: May 9, 2023

(65) Prior Publication Data

US 2023/0418143 A1 Dec. 28, 2023

(30) Foreign Application Priority Data

Jun. 22, 2022 (CN) .......................... 202210711901.6

(51) Int. Cl.
*G03B 21/00* (2006.01)
*G02B 26/00* (2006.01)
*G03B 21/20* (2006.01)

(52) U.S. Cl.
CPC .......... *G03B 21/204* (2013.01); *G02B 26/008* (2013.01); *G03B 21/208* (2013.01)

(58) Field of Classification Search
CPC ... G02B 26/008; G03B 21/204; G03B 21/208
See application file for complete search history.

(56) References Cited

U.S. PATENT DOCUMENTS

| 2020/0103736 | A1* | 4/2020 | Kurosaki | G03B 21/204 |
| 2023/0066523 | A1* | 3/2023 | Kang | C09K 11/7774 |
| 2023/0142610 | A1* | 5/2023 | Hsu | G03B 21/20 362/84 |
| 2023/0280583 | A1* | 9/2023 | Kim | G03B 33/08 353/31 |

FOREIGN PATENT DOCUMENTS

| CN | 205720746 | 11/2016 |
| CN | 206946178 | 1/2018 |
| CN | 111812928 | 10/2020 |

\* cited by examiner

*Primary Examiner* — Gerald J Sufleta, II
(74) *Attorney, Agent, or Firm* — JCIPRNET (57) ABSTRACT

A wavelength conversion device includes a substrate, a reflection layer, a wavelength conversion layer, and a first optical layer. The wavelength conversion device has a central axis. The reflection layer is disposed on an upper surface of the substrate. The central axis is perpendicular to the upper surface. The wavelength conversion layer is disposed on the reflection layer and around the central axis, has a complete or partial annular shape, and includes a first region and two second regions. The first region is located between the second regions. The first optical layer is disposed on a surface of the wavelength conversion layer and corresponds to the first region. In an axial direction, an orthographic projection of the first optical layer on the upper surface is not overlapped with an orthographic projection of the second regions on the upper surface. The first optical layer includes first diffusing particles.

30 Claims, 8 Drawing Sheets

WAVELENGTH CONVERSION DEVICE AND PROJECTION DEVICE

CROSS-REFERENCE TO RELATED APPLICATION

This application claims the priority benefit of China application serial no. 202210711901.6, filed on Jun. 22, 2022. The entirety of the above-mentioned patent application is hereby incorporated by reference herein and made a part of this specification.

BACKGROUND OF THE INVENTION

Field of the Invention

The invention relates to an optical element and an electronic device, and in particular, to a wavelength conversion device and a projection device.

Description of Related Art

A projection device is a display device used to generate large-scale images, and is constantly improving with the evolution and innovation of science and technology. The imaging principle of the projection device is to convert an illumination light beam generated by an illumination system into an image light beam via a light valve, and then project the image light beam to a projection target (such as a screen or a wall) via a projection lens to form a projected image. Moreover, the illumination system has also evolved from ultra-high-performance (UHP) lamps and light-emitting diodes (LED), to laser diode (LD) light sources in response to market requirements such as brightness, color saturation, service life, and non-toxicity and environmental protection of projection devices.

Currently, the phosphor wheel is configured with a reflection layer (mirror reflection layer or diffuse reflection layer) on the surface of a substrate, the upper surface of the reflection layer has a wavelength conversion layer, and the wavelength conversion layer may emit converted light of corresponding wavelength and brightness after being excited by laser light. However, due to the Gaussian distribution of laser energy, the energy at the center of the laser spot is higher and the energy of the laser toward the outside is lower. When the energy of the laser is too high, the wavelength conversion layer in this region generates more heat due to excessive energy. As a result, the conversion efficiency of the wavelength conversion layer is poor, and the brightness of the converted light is reduced. The current solution is to place a diffuser between the lens and the wavelength conversion layer. However, when the laser light passes through the lens and then passes through the diffuser, the total energy of the laser is reduced, and therefore brightness is reduced, and the region on the fluorescent color wheel used to generate blue light (for example, no wavelength conversion layer, only transmissive glass coated with an anti-reflection film or reflective glass coated with a reflection layer) also reduces the brightness of blue light due to passing through the diffuser.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a wavelength conversion device and a projection device that may improve the conversion efficiency of the wavelength conversion layer, so as to increase the brightness of the light beam emitted from the wavelength conversion device and increase the service life of the wavelength conversion layer.

Other objects and advantages of the invention may be further understood from the technical features disclosed in the invention.

In order to achieve one or part or all of the above objects or other objects, the invention provides a wavelength conversion device including a substrate, a reflection layer, a wavelength conversion layer, and a first optical layer. The wavelength conversion device has a central axis, and the reflection layer is disposed on an upper surface of the substrate. The central axis is perpendicular to the upper surface of the substrate. The wavelength conversion layer is disposed on the reflection layer, the wavelength conversion layer is disposed around the central axis and has an annular shape, and the wavelength conversion layer includes a first region and two second regions. The first region is located between the two second regions. The first optical layer is disposed on a surface of the wavelength conversion layer and corresponds to the first region, wherein an orthographic projection of the first optical layer on the upper surface of the substrate in an axial direction is not overlapped with an orthographic projection of the two second regions on the upper surface of the substrate in the axial direction. The first optical layer includes a plurality of first diffusing particles.

To achieve one or part or all of the above objects or other objects, the invention further provides a projection device including an illumination system, at least one light valve, and a projection lens. The illumination system is used to provide an illumination light beam. The illumination system includes a wavelength conversion device. The wavelength conversion device includes a substrate, a reflection layer, a wavelength conversion layer, and a first optical layer. The wavelength conversion device has a central axis, and the reflection layer is disposed on an upper surface of the substrate. The central axis is perpendicular to the upper surface of the substrate. The wavelength conversion layer is disposed on the reflection layer, the wavelength conversion layer is disposed around the central axis and has an annular shape, and the wavelength conversion layer includes a first region and two second regions. The first region is located between the two second regions. The first optical layer is disposed on a surface of the wavelength conversion layer and corresponds to the first region, wherein an orthographic projection of the first optical layer on the upper surface of the substrate in an axial direction is not overlapped with an orthographic projection of the two second regions on the upper surface of the substrate in the axial direction. The first optical layer includes a plurality of first diffusing particles. The at least one light valve is disposed on a transmission path of the illumination light beam and used to convert the illumination light beam into an image light beam. The projection lens is disposed on a transmission path of the image light beam and used to project the image light beam out of the projection device.

Based on the above, the embodiments of the invention have at least one of the following advantages or efficacies. In the wavelength conversion device and the projection device of the invention, the wavelength conversion device includes a substrate, a reflection layer, a wavelength conversion layer, and a first optical layer. In particular, the first optical layer is disposed on the upper surface of the wavelength conversion layer and corresponds to the first region. In addition, the first optical layer includes a plurality of first diffusing particles used to diffuse the excitation light beam transmitted to the first optical layer so as to be distributed uniformly, thereby reducing the concentration degree of the center energy of the light beam spot. However, the energy at the edge of the light beam spot is lower, and when the excitation light beam is incident on the two second regions not overlapped with the first optical layer in the axial direction, since the excitation light beam does not pass through the first optical layer, no homogenizing effect is produced, thus avoiding loss of light efficiency. In this way, the conversion efficiency of the wavelength conversion layer may be improved, so as to increase the brightness of the light beam emitted from the wavelength conversion device and increase the service life of the wavelength conversion device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
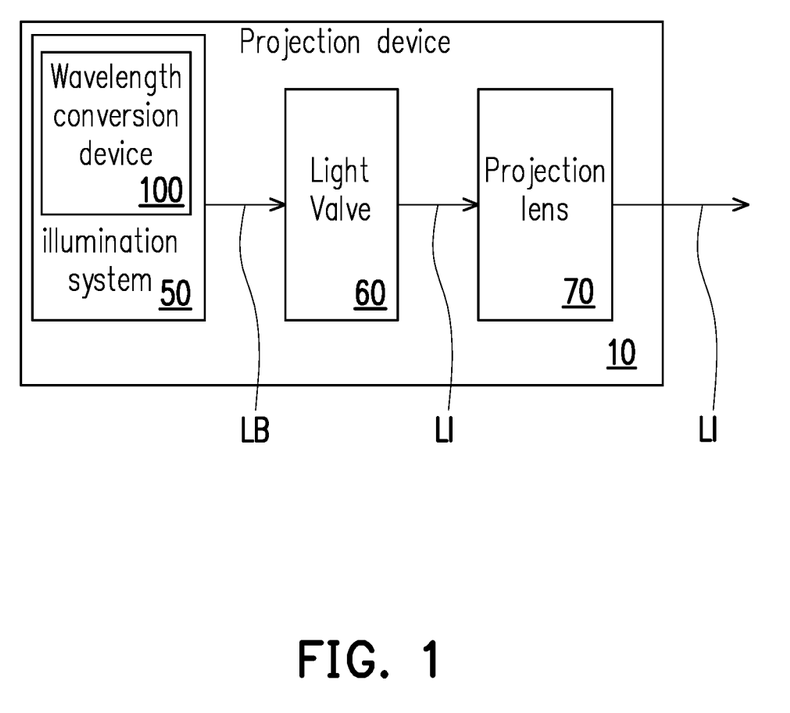
FIG. 1 is a schematic diagram of a projection device of an embodiment of the invention.

FIG. 1 is a schematic diagram of a projection device of an embodiment of the invention. Please refer to FIG. 1. The present embodiment provides a projection device 10 including an illumination system 50, at least one light valve 60, and a projection lens 70. In particular, the illumination system 50 is used to provide an illumination light beam LB. The at least one light valve 60 is disposed on the transmission path of the illumination light beam LB and used to convert the illumination light beam LB into an image light beam LI. The projection lens 70 is disposed on the transmission path of the image light beam LI and used to project the image light beam LI out of the projection device 10 to a projection target (not shown), such as a screen or a wall.

Figure 4:
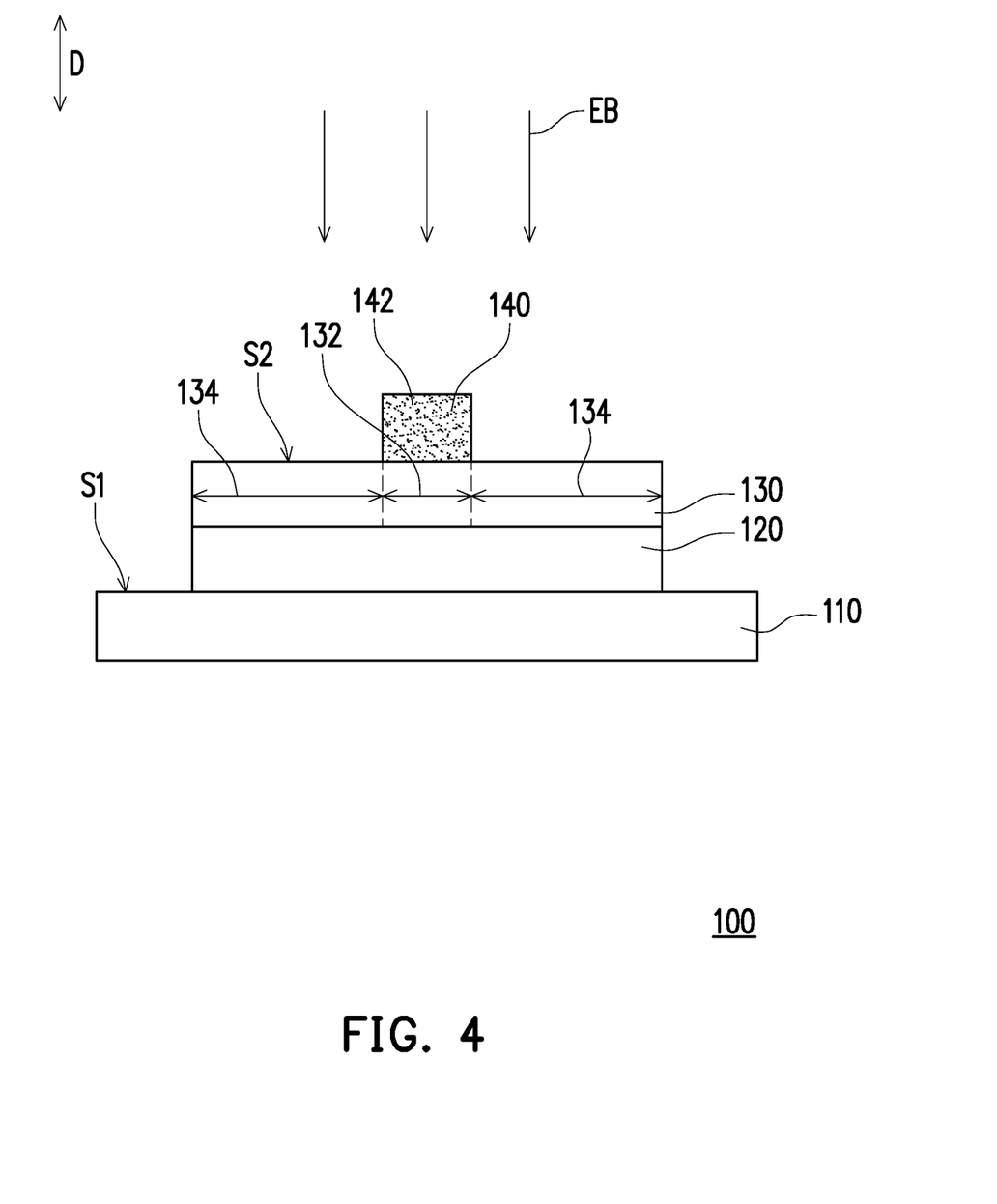
FIG. 4 is a schematic cross-sectional view of the wavelength conversion device of FIG. 2 along line A-A'.
Figure 5:
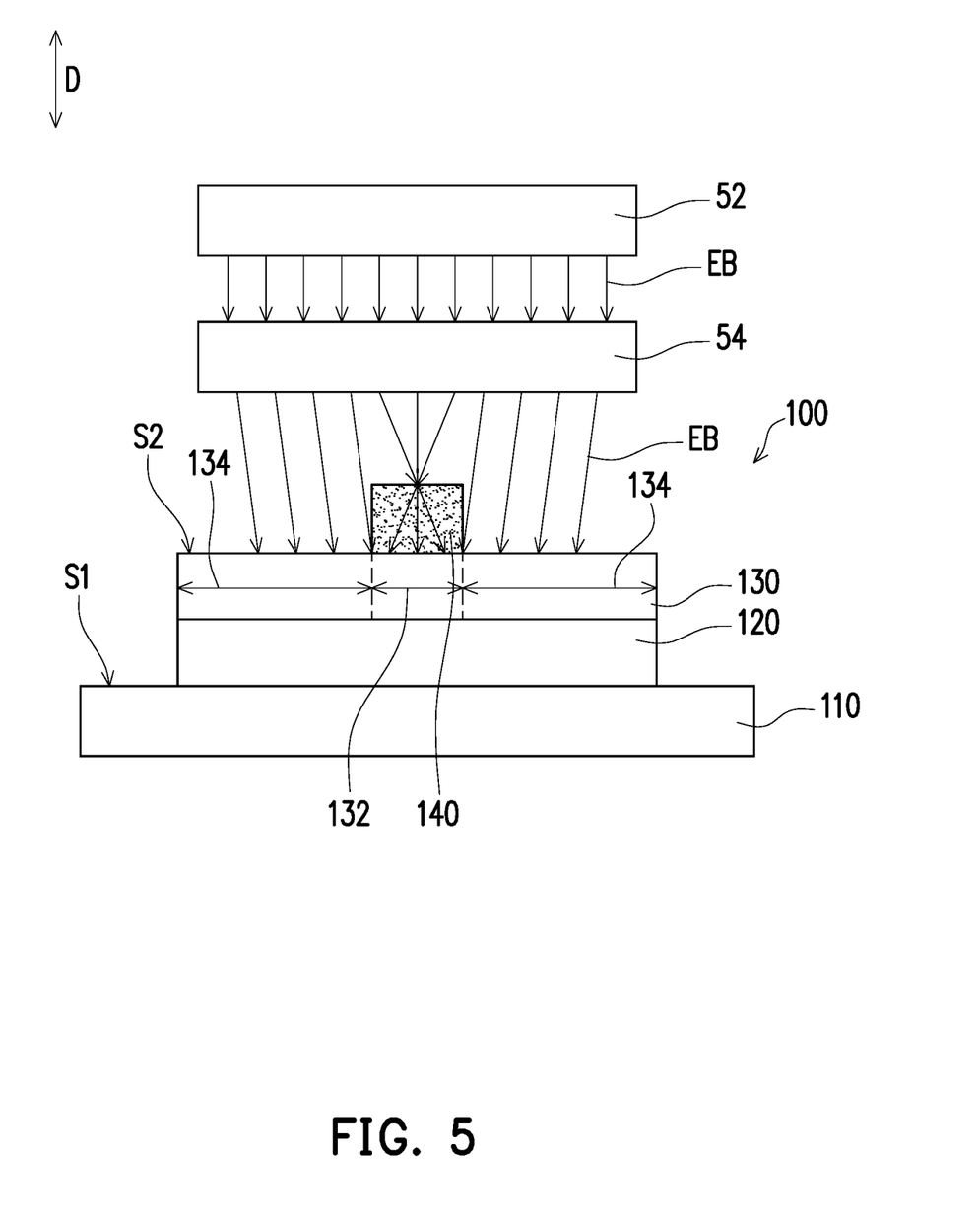
FIG. 5 is a schematic cross-sectional view of the wavelength conversion device of FIG. 4 applied to a projection device.

The illumination system 50 is used to provide the illumination light beam LB. For example, in the present embodiment, the illumination system 50 is formed by, for example, a plurality of light-emitting elements 52 (as shown in FIG. 5), a wavelength conversion device 100, a light-homogenizing element, a light filter element, and a plurality of light splitting and combining elements to provide light of different wavelengths to form the illumination light beam LB. The plurality of light-emitting elements are, for example, laser diodes (LD) used to provide an excitation light beam EB (as shown in FIG. 4 and FIG. 5). However, the invention does not limit the type or form of the illumination system 50 in the projection device 10, and sufficient teaching, suggestion, and implementation of the detailed structure and embodiments thereof may be obtained from common knowledge in the art, which are therefore not repeated herein. The wavelength conversion device 100 is further described in the following paragraphs.

The light valve 60 is, for example, a reflective light modulator such as a liquid crystal on silicon panel (LCoS panel) or a digital micro-mirror device (DMD). In some embodiments, the light valve 60 may also be a transmissive light modulator such as a transparent liquid-crystal panel, an electro-optical modulator, a magneto-optic modulator, or an acousto-optic modulator (AOM). The invention does not limit the configuration and the type of the light valve 60. Regarding the method in which the light valve 60 converts the illumination light beam LB into the image light beam L1, sufficient teaching, suggestion, and implementation of the detailed steps and embodiments thereof may be obtained from common knowledge in the art, which are therefore not repeated herein. In the present embodiment, the number of the light valve 60 is one, for example, the projection device 10 using a single digital micromirror element, but in other embodiments, there may be more than one, and the invention is not limited thereto.

The projection lens 70 includes, for example, a combination of one or a plurality of optical lenses having a diopter, such as including, for example, various combinations of a non-planar lens such as a biconcave lens, a lenticular lens, a concave-convex lens, a convex-concave lens, a plano-convex lens, a plano-concave lens, and the like. In an embodiment, the projection lens 70 may also include a flat optical lens projecting the image light beam LI from the light valve 60 to the projection target in a reflective manner. The invention does not limit the configuration and the type of the projection lens 70.

Figure 2:
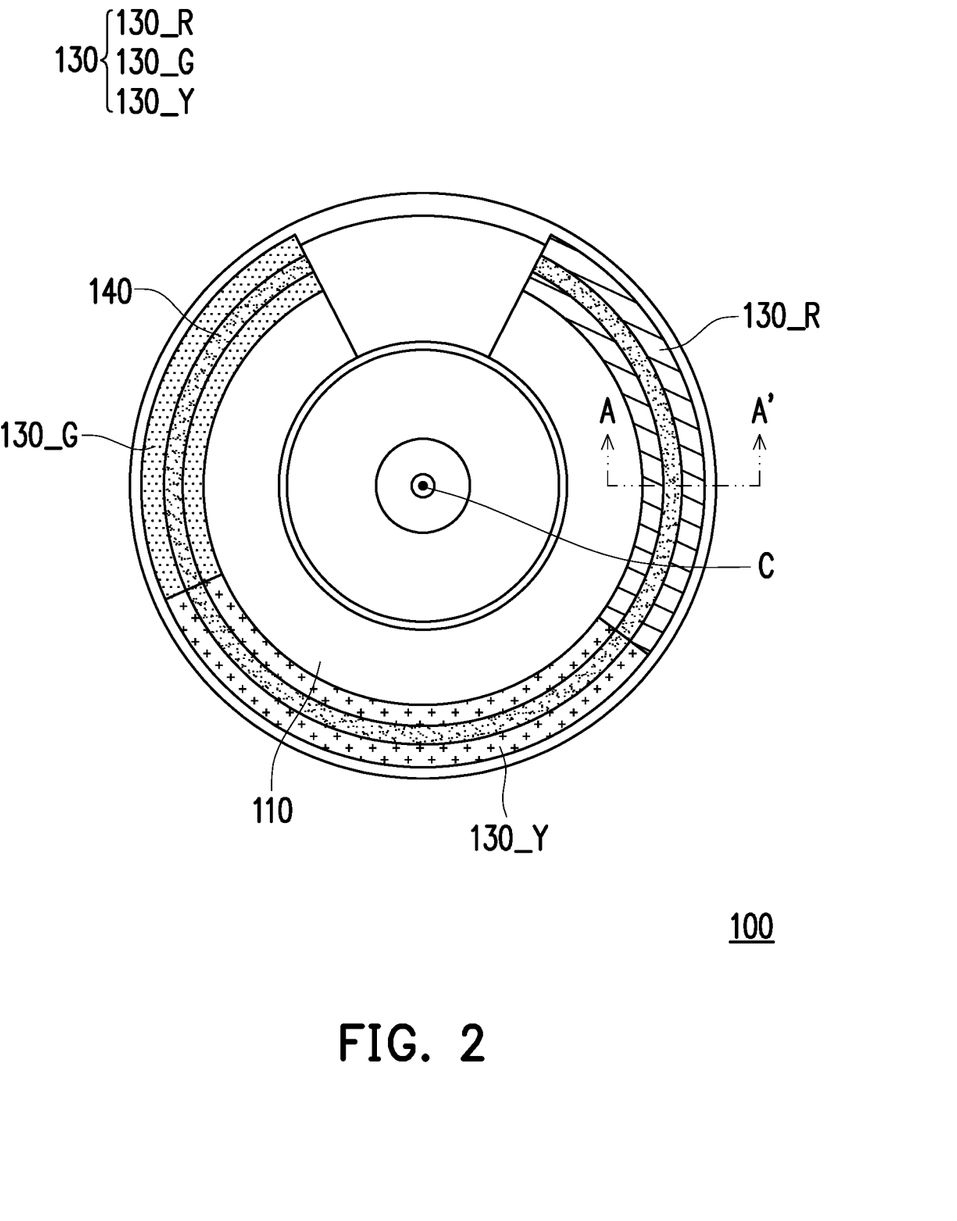
FIG. 2 is a schematic diagram of a wavelength conversion device of an embodiment of the invention.
Figure 3:
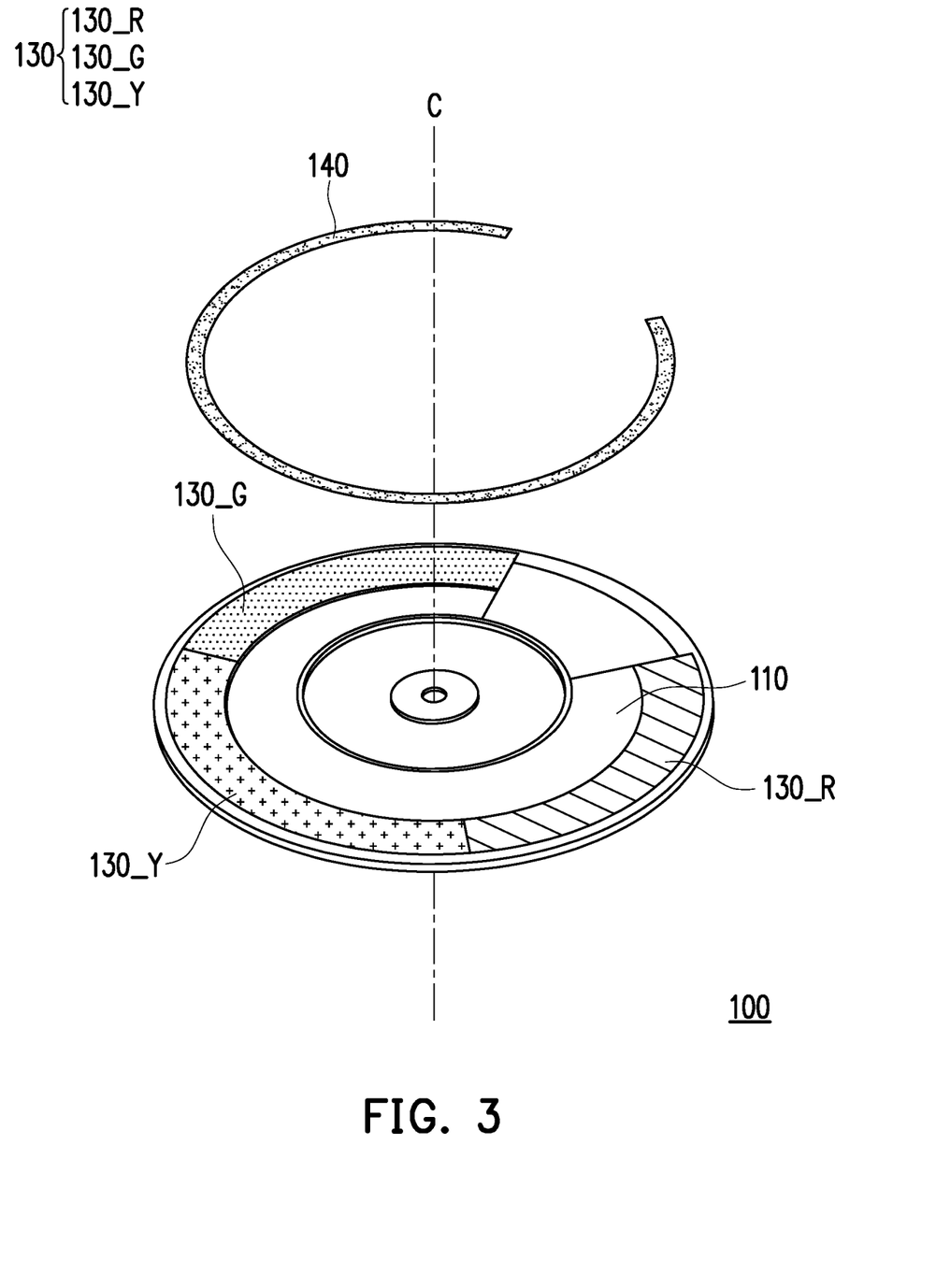
FIG. 3 is a partially exploded perspective view of the wavelength conversion device of FIG. 2.

FIG. 2 is a schematic diagram of a wavelength conversion device of an embodiment of the invention. FIG. 3 is a partially exploded perspective view of the wavelength conversion device of FIG. 2. FIG. 4 is a schematic cross-sectional view of the wavelength conversion device of FIG. 2 along line A-A'. Please refer to FIG. 1 to FIG. 4. In the present embodiment, the illumination system 50 includes the wavelength conversion device 100, and the wavelength conversion device 100 includes a substrate 110, a reflection layer 120, a wavelength conversion layer 130, and a first optical layer 140. In the present embodiment, the wavelength conversion device 100 has a central axis C, and the substrate 110 is, for example, a circular turntable, and is used to be connected to a driving element (not shown) on the central axis C. The driving element drives the substrate 110 and the reflection layer 120, the wavelength conversion layer 130, and the first optical layer 140 on the substrate 110 to rotate with the central axis C as the rotation axis. The reflection layer 120 is disposed on an upper surface S1 of the substrate 110, and the central axis C is perpendicular to the upper surface S1 of the substrate 110. The reflection layer 120 is used to reflect the excitation light beam transmitted to the wavelength conversion device 100 and the converted light beam converted by the wavelength conversion layer, so as to increase light utilization efficiency. In the present embodiment, the reflection layer 120 is a reflective coating on the substrate 110, but the invention is not limited thereto. In other embodiments, the substrate 110 may be a metal substrate. In the present embodiment, the wavelength conversion device 100 may further include members such as a driving element, a weight ring, and a coated glass according to requirements, but the invention is not limited thereto.

The wavelength conversion layer 130 is disposed on the reflection layer 120. The wavelength conversion layer 130 is disposed around the central axis C and has an annular or partially annular shape. For example, in the present embodiment, the wavelength conversion layer 130 includes a red wavelength conversion layer 130_R, a green wavelength conversion layer 130_G, and a yellow wavelength conversion layer 130_Y connected to form a complete or partially annular wavelength conversion layer 130, but the invention is not limited thereto. It may be seen from FIG. 2 that the wavelength conversion layer 130 of the wavelength conversion device 100 is partially annular around the central axis C, and the portion (not labeled) without the wavelength conversion layer 130 is an excitation light beam transmissive/reflecting region used to generate blue light, and the excitation light beam transmissive/reflecting region and the wavelength conversion layer 130 form a complete ring around the central axis C together. The wavelength conversion layer 130 includes a first region 132 and two second regions 134, and the first region 132 is located between the two second regions 134 in a direction perpendicular to the central axis C, wherein either of the first region 132 and the second regions 134 is also partially annular around the central axis C. It should be mentioned that the wavelength conversion layer 130 includes a wavelength conversion material, and the wavelength conversion material in the first region 132 corresponding to any one of the red wavelength conversion layer 130_R, the green wavelength conversion layer 130_G, and the yellow wavelength conversion layer 130_Y in FIG. 3 is the same as the wavelength conversion material in the two second regions 134. In other words, the first region 132 and the two second regions 134 are continuous structures. In the present embodiment, the wavelength conversion layer 130 is used to receive the excitation light beam EB, and the excitation light beam EB may form a light spot (not shown) on the wavelength conversion layer, wherein the first region 132 is overlapped with the region where the excitation light beam EB irradiates the wavelength conversion layer 130 and the illuminance is greater than 50% of the maximum illuminance. In a preferred embodiment, the first region 132 is overlapped with the region where the illumination light beam LB irradiates the wavelength conversion layer 130 and the illuminance is greater than 60% of the maximum illuminance. In a more preferred embodiment, the first region 132 is overlapped with the region where the excitation light beam EB irradiates the wavelength conversion layer 130 and the illuminance is greater than 75% of the maximum illuminance. In other words, the center of the light spot of the excitation light beam EB is irradiated to the first region 132, and the edge (or periphery) of the light spot of the excitation light beam EB is irradiated to the second regions 134.

FIG. 4 is a schematic cross-sectional view of the wavelength conversion device of FIG. 2 along line A-A'. FIG. 5 is a schematic cross-sectional view of the wavelength conversion device of FIG. 4 applied to a projection device. Please refer to FIG. 4 and FIG. 5. The difference between FIG. 5 and FIG. 4 is FIG. 5 shows a plurality of light-emitting elements 52 and a lens 54 in the illumination system 50 (see FIG. 1), the light-emitting elements 52 are used to provide the excitation light beam EB, the lens 54 is, for example, a condenser lens, and the excitation light beam EB is incident on the wavelength conversion device 100 after passing through the lens 54. The first optical layer 140 is disposed on an upper surface S2 of the wavelength conversion layer 130 and corresponds to the first region 132 of the wavelength conversion layer 130, wherein the orthographic projection of the first optical layer 140 on the upper surface S1 of the substrate 110 in an axial direction D is not overlapped with the orthographic projection of the two second regions 134 on the upper surface S1 of the substrate 110 in the axial direction D, and the orthographic projection of the first optical layer 140 on the upper surface S1 of the substrate 110 in the axial direction D is overlapped with the orthographic projection of the first region 132 on the upper surface S1 of the substrate 110 in the axial direction D, wherein the axial direction D is parallel to the central axis C of the wavelength conversion device 100. The first optical layer 140 includes a plurality of first diffusing particles 142 used to diffuse the excitation light beam EB transmitted to the first optical layer 140 to be uniformly distributed, thereby reducing the concentration degree of energy at the center of the light beam spot. The energy at the edge (or periphery) of the light spot of the excitation light beam EB is lower, and when incident on the wavelength conversion layer of the two second regions 134 not overlapped with the first optical layer 140 in the axial direction D, since the illumination light beam LB does not pass through the first optical layer 140, a homogenizing effect is not generated and loss of light efficiency is avoided. In this way, the conversion efficiency of the wavelength conversion layer 130 may be improved, so as to increase the brightness of the light beam emitted from the wavelength conversion device and increase the service life of the wavelength conversion device.

Specifically, in some preferred embodiments, the length of the first region 132 in the direction perpendicular to the axial direction D is greater than 0.25 times and less than or equal to 0.5 times the length of the wavelength conversion layer 130 in the direction perpendicular to the axial direction D. In a preferred embodiment, the length of the first region 132 in the direction perpendicular to the axial direction D is 0.5 times the length of the wavelength conversion layer 130 in the direction perpendicular to the axial direction D. For example, the radial width of the first optical layer 140 is about 2 mm, wherein the radial width is the length in the direction perpendicular to the axial direction D. Therefore, the region of the first optical layer 140 can be prevented from being too large and causing excessive energy loss, and at the same time, the region of the first optical layer 140 may also be prevented from being too small to reliably disperse the energy of the beam energy concentration region. In another preferred embodiment, the first optical layer 140 may further include a first adhesive, and the plurality of first diffusing particles 142 are mixed in the first adhesive, but the invention is not limited thereto. For example, the first adhesive may adopt silica gel, inorganic adhesive, and organic adhesive mixed with white scattering particles, for example, titanium dioxide ($TiO_2$), silicon dioxide ($SiO_2$), aluminum oxide ($Al_2O_3$), boron nitride (BN), zirconium dioxide ($ZrO_2$), etc., or any combination thereof. Manufacture may be performed on the surface of the wavelength conversion layer located in the first region 132 by means such as coating, printing, and spraying. In a preferred embodiment, the wavelength conversion layer 130 includes a second adhesive and a wavelength conversion material, and the wavelength conversion material is mixed in the second adhesive, wherein the first adhesive 144 and the second adhesive may be the same material to enhance adhesive strength, but the invention is not limited thereto.

Moreover, in the axial direction D, the thickness of the first optical layer 140 is, for example, less than or equal to 20 microns. In a preferred embodiment, the thickness of the first optical layer 140 is less than or equal to 10 microns. In a more preferred embodiment, the thickness of the first optical layer 140 is between 3 microns and 5 microns, but the invention is not limited thereto. Moreover, the concentration of the plurality of first diffusing particles 142 in the first optical layer 140 is less than or equal to 10% volume percent concentration. In a preferred embodiment, the concentration of the plurality of first diffusing particles 142 in the first optical layer 140 is between 3% volume percent concentration and 10% volume percent concentration. In a more preferred embodiment, the concentration of the plurality of first diffusing particles 142 in the first optical layer 140 is between 5% volume percent concentration and 7% volume percent concentration, but the invention is not limited thereto. Moreover, the particle size of the first diffusing particles 142 is less than or equal to 0.5 microns, and in a preferred embodiment, the particle size of the first diffusing particles 142 is between 0.1 microns and 0.3 microns. In a more preferred embodiment, the particle size of the first diffusing particles 142 is between 0.1 microns to 0.2 microns. In this way, excessive energy loss due to excessively large particle size of the first diffusing particles 142 may be avoided, but the invention is not limited thereto.

Figure 6:
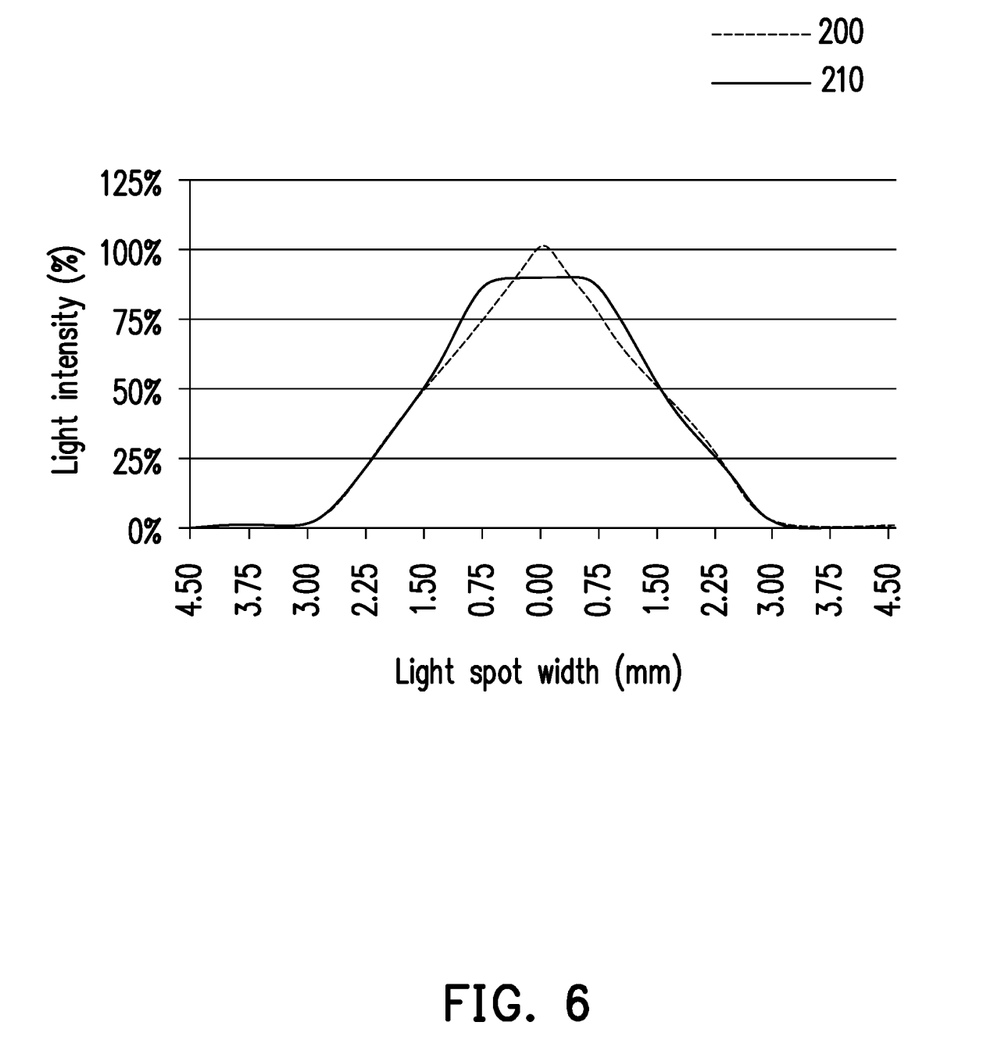
FIG. 6 is an energy distribution diagram of the wavelength conversion device of FIG. 5 and a conventional wavelength conversion device.

FIG. 6 is an energy distribution diagram of the wavelength conversion device of FIG. 5 and a conventional wavelength conversion device. Please refer to FIG. 5 and FIG. 6. In particular, curve 200 represents the energy distribution of the excitation light beam on a conventional wavelength conversion device, and curve 210 represents the energy distribution of the excitation light beam on the wavelength conversion device 100 of the present embodiment. It may be known from the simulation diagram shown in FIG. 6 that, since the wavelength conversion device 100 of the present embodiment is configured with the first optical layer 140 containing the plurality of first diffusing particles 142 and the first optical layer 140 corresponds to the first region 132 of the wavelength conversion layer, the illumination light beam LB transmitted to the first optical layer 140 may be diffused and evenly distributed, thereby reducing the concentration degree of the energy at the center of the light beam spot. However, the energy at the edge of the light beam spot is lower, and when incident on the two second regions 134 not overlapped with the first optical layer 140 in the axial direction D, since the excitation light beam EB does not pass through the first optical layer 140, no homogenizing effect is produced, thus avoiding loss of light efficiency. In this way, compared to the conventional wavelength conversion device, the wavelength conversion device 100 of the present embodiment may improve the conversion efficiency of the wavelength conversion layer 130, thereby increasing the brightness of the light beam emitted from the wavelength conversion device and increasing the service life of the wavelength conversion device.

Figure 7:
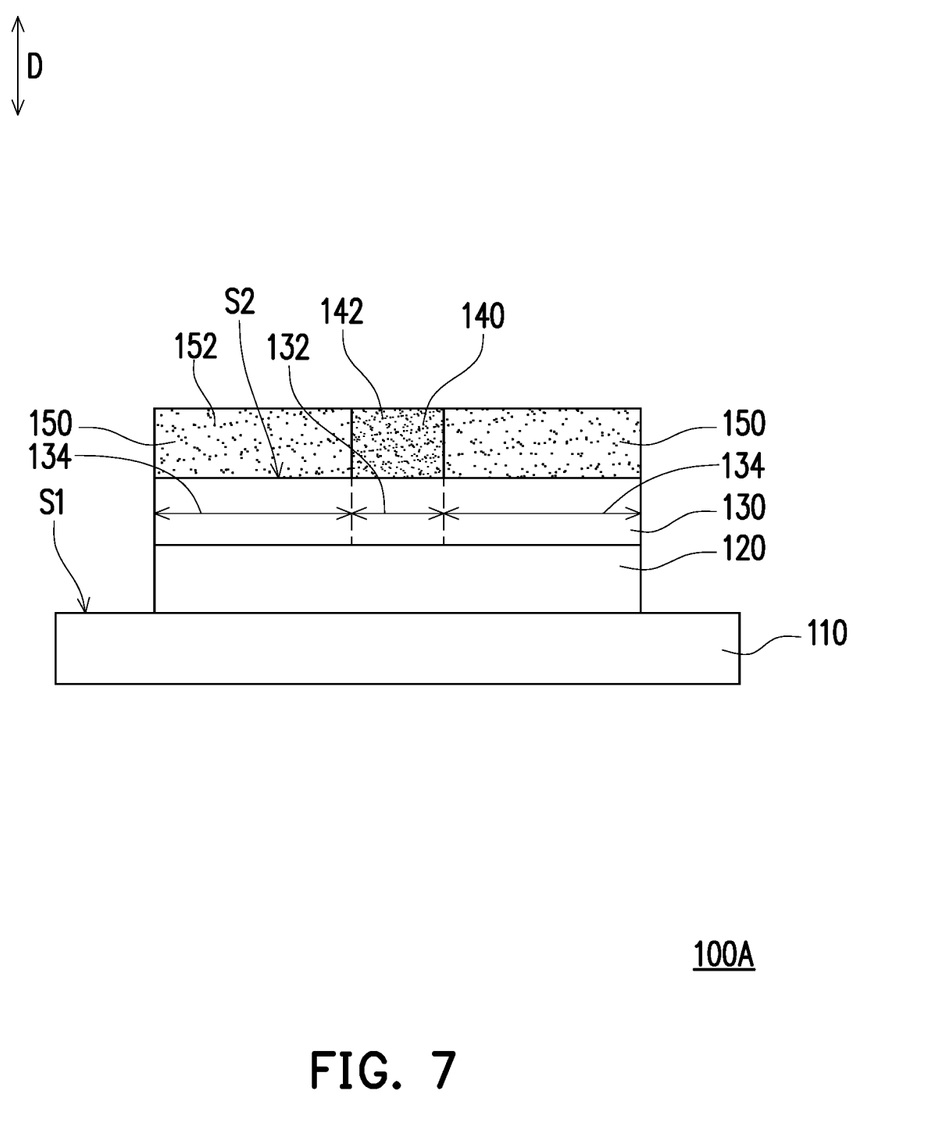
FIG. 7 is a schematic cross-sectional view of a wavelength conversion device of another embodiment of the invention.

FIG. 7 is a schematic cross-sectional view of a wavelength conversion device of another embodiment of the invention. Please refer to FIG. 7. A wavelength conversion device 100A of the present embodiment is similar to the wavelength conversion embodiment 100 shown in FIG. 4. The difference between the two is, in the present embodiment, the wavelength conversion device 100 further includes two second optical layers 150 disposed on the upper surface S2 of the wavelength conversion layer 130 and respectively corresponding to the two second regions 134 of the wavelength conversion layer 130. In a direction perpendicular to the axial direction, the first optical layer 140 is located between the two second optical layers 150. The orthographic projection of the two second optical layers 150 on the upper surface S1 of the substrate 110 in the axial direction D is not overlapped with the orthographic projection of the first region 132 on the upper surface S1 of the substrate 110 in the axial direction D, and the orthographic projection of the two second optical layers 150 on the upper surface S1 of the substrate 110 in the axial direction D is overlapped with the orthographic projection of the second regions 134 on the upper surface S1 of the substrate 110 in the axial direction D. The two second optical layers 150 include a plurality of second diffusing particles 152. The composition of the plurality of second diffusing particles 152 may be selected to be the same as or different from the composition of the plurality of first diffusing particles 142, and the invention is not limited thereto. In particular, in the present embodiment, the average thickness of the first optical layer 140 in the axial direction D is the same as the average thickness of the two second optical layers 150 in the axial direction D, and the concentration of the plurality of first diffusing particles 142 in the first optical layer 140 is greater than the concentration of the plurality of second diffusing particles 152 in the two second optical layers 150. In this way, the excitation light beam EB transmitted to the first optical layer 140 has a larger diffusion effect and a homogenized distribution, thereby reducing the concentration degree of the center energy of the light beam spot. The excitation light beam EB transmitted to the second optical layer 150 produces less diffusion and a homogenized distribution. In this way, the conversion efficiency of the wavelength conversion layer 130 may be improved, so as to increase the brightness of the light beam emitted from the wavelength conversion device and increase the service life.

For example, in the present embodiment, the concentration of the plurality of first diffusing particles 142 in the first optical layer 140 is 5% to 7%, and the concentration of the plurality of second diffusing particles 152 in the two second optical layers 150 is less than 5%. In a preferred embodiment, the concentration of the plurality of second diffusing particles 152 in the two second optical layers 150 is gradually reduced from adjacent to the first optical layer 140 toward the direction away from the first optical layer 140. For example, the concentration of the plurality of second diffusing particles 152 in the two second optical layers 150 shows a gradient change from adjacent to the first optical layer 140 away from the first optical layer 140. That is, the concentration of the plurality of second diffusing particles 152 in the two second optical layers 150 is gradually reduced from adjacent to the first optical layer 140 away from the first optical layer 140. Or, in a preferred embodiment, the concentration of the plurality of first diffusing particles 142 in the first optical layer 140 and the concentration of the second diffusing particles 152 in the two second optical layers 150 jointly show a gradient change. That is, the concentration of the plurality of first diffusing particles 142 in the first optical layer 140 is gradually reduced from the center of the first optical layer 140 toward the edge, and the concentration of the plurality of second diffusing particles 152 in the two second optical layers 150 is gradually reduced from the center of the first optical layer 140 toward the edge of the second optical layers 150. In addition to the gradient change, in different embodiments, the concentration may also be presented as a continuous change, and the invention is not limited thereto. The above concentration definition may further prevent excessive energy loss caused by a diffusion particle concentration that is too high, and also prevent the diffusion particle concentration from being too small to reliably disperse energy, but the invention is not limited thereto.

Figure 8:
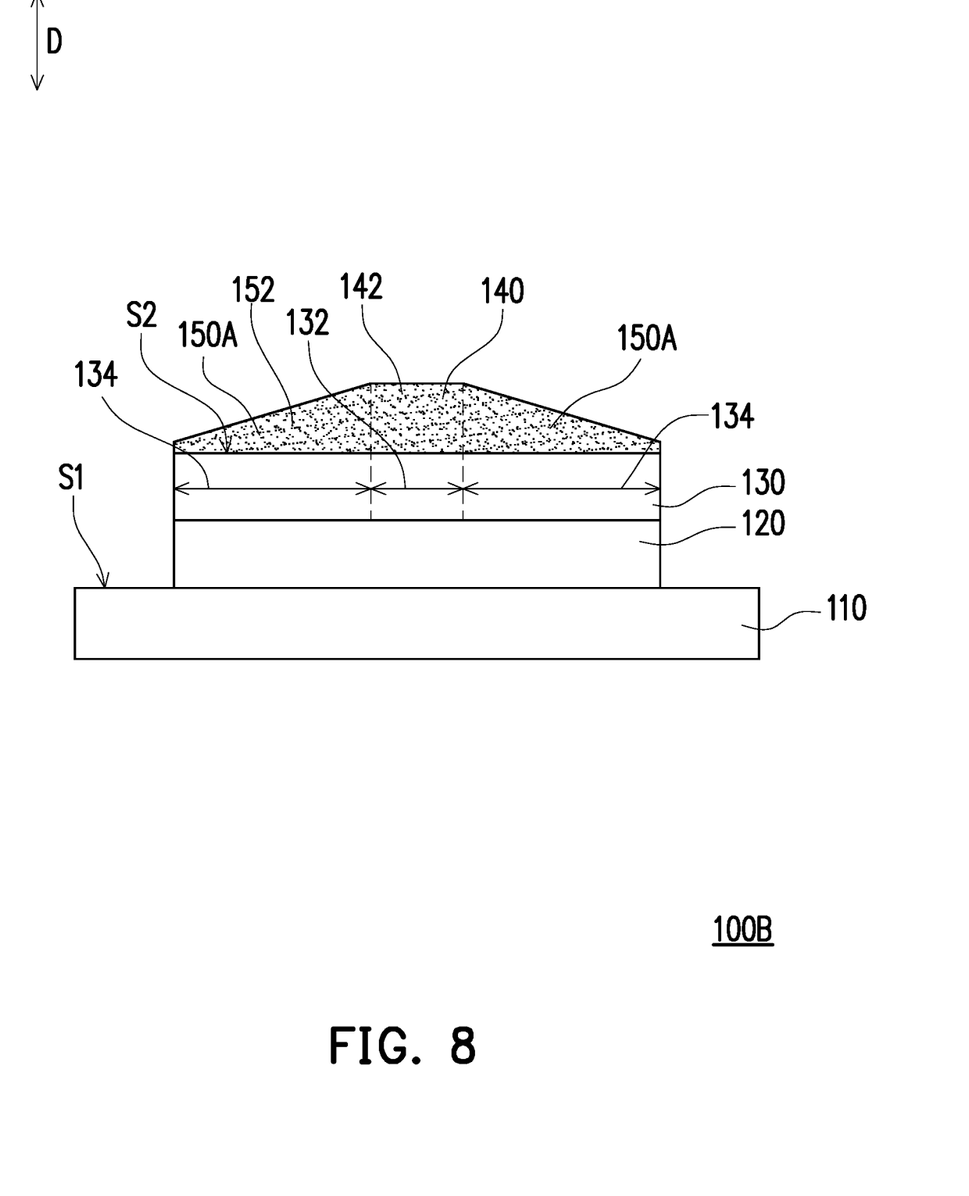
FIG. 8 is a schematic cross-sectional view of a wavelength conversion device of another embodiment of the invention.

FIG. 8 is a schematic cross-sectional view of a wavelength conversion device of another embodiment of the invention. Please refer to FIG. 8. A wavelength conversion device 100B of the present embodiment is similar to the wavelength conversion embodiment 100 shown in FIG. 4. The difference between the two is that, in the present embodiment, the average thickness of the first optical layer 140 in the axial direction D is greater than the average thickness of the two second optical layers 150A in the axial direction D, and the concentration of the plurality of first diffusing particles 142 in the first optical layer 140 is the same as the concentration of the plurality of second diffusing particles 152 in the two second optical layers 150A. The average thickness of the two second optical layers 150A in the axial direction D is gradually reduced from adjacent to the first optical layer 140 to the direction away from the first optical layer 140. In detail, the average thickness of the two second optical layers 150A in the axial direction D shows a gradient change or a continuous change. In this way, the excitation light beam EB transmitted to the first optical layer 140 has a larger diffusion effect and a homogenized distribution, thereby reducing the concentration degree of the center energy of the light beam spot. The excitation light beam EB transmitted to the second optical layers 150A produces less diffusion and a homogenized distribution. In this way, the conversion efficiency of the wavelength conversion layer 130 may be improved, so as to increase excitation brightness and increase the service life.

For example, in the present embodiment, the average thickness of the first optical layer 140 in the axial direction D is less than or equal to 20 microns, and the average thickness of the second optical layers 150A in the axial direction D is less than or equal to 10 microns. In a preferred embodiment, the average thickness of the first optical layer 140 in the axial direction D is between 3 microns and 10 microns, and the average thickness of the second optical layers 150A in the axial direction D is between 2 microns and 7 microns. In a more preferred embodiment, the average thickness of the first optical layer 140 in the axial direction D is between 5 microns and 7 microns, and the average thickness of the second optical layers 150A in the axial direction D is between 2 microns and 5 microns. In another preferred embodiment, the average thickness of the second optical layers 150A in the axial direction D is gradually reduced from adjacent to the first optical layer 140 toward the direction away from the first optical layer 140. Alternatively, in a more preferred embodiment, the average thicknesses of the first optical layer 140 and the second optical layers 150A in the axial direction D jointly show a gradient change. That is to say, the average thickness of the first optical layer 140 and the second optical layers 150A in the axial direction D is gradually reduced from the center to the edge. In addition to the gradient change, in different embodiments, the average thickness may also be presented as a continuous change, and the invention is not limited thereto. The above definition of the average thickness may further prevent the optical layer from being too thick and causing excessive energy loss, and also prevent the optical layer from being too thin to reliably disperse energy, but the invention is not limited thereto.

In any embodiment above, the reflection layer 120 includes a plurality of third diffusing particles (not shown), and the concentration of the plurality of third diffusing particles in the reflection layer 120 is greater than the concentration of the plurality of first diffusing particles 142 in the first optical layer 140. In particular, the orthographic projection of the reflection layer 120 on the upper surface S1 of the substrate 110 in the axial direction D is overlapped with the orthographic projection of the first region 132 and the two second regions 134 on the upper surface S1 of the substrate 110 in the axial direction D. The third diffusing particles and the first diffusing particles 142 may be the same or different. Therefore, the reflection layer 120 may be formed as a diffuse reflection layer. In a preferred embodiment, the concentration of the first diffusing particles 142 contained in the first optical layer 140 is lower than the concentration of the third diffusing particles contained in the reflection layer 120. In this way, when the reflection layer 120 contains the third diffusing particles, when the excitation light beam EB or the converted light beam converted by the wavelength conversion layer is incident on the third diffusing particles, the excitation light beam EB or the converted light beam converted by the wavelength conversion layer may be diffused in various directions. In other words, a portion of the light beam returns to the incident direction, and therefore the concentration of the third diffusing particles varies depending on the object of the layer. In this way, light utilization efficiency may be further improved. In addition, the illumination light beam LB mentioned in any of the above embodiments includes at least one of the excitation light beam EB and the converted light beam.

Based on the above, in the wavelength conversion device and the projection device of the invention, the wavelength conversion device includes a substrate, a reflection layer, a wavelength conversion layer, and a first optical layer. In particular, the first optical layer is disposed on the upper surface of the wavelength conversion layer and corresponds to the first region of the wavelength conversion layer. In addition, the first optical layer includes a plurality of first diffusing particles used for diffusing the excitation light beam transmitted to the first optical layer to be distributed uniformly, thereby reducing the concentration degree of the center energy of the light beam spot. However, the energy at the edge of the light beam spot is lower, and when the excitation light beam is incident on the two second regions not overlapped with the first optical layer in the axial direction, since the excitation light beam of the portion does not pass through the first optical layer, no homogenizing effect is produced, thus avoiding loss of light efficiency. In this way, the conversion efficiency of the wavelength conversion layer may be improved, so as to increase the brightness of the light beam emitted from the wavelength conversion device and increase service life.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion device, comprising a substrate, a reflection layer, a wavelength conversion layer, and a first optical layer; wherein
   the wavelength conversion device has a central axis and the reflection layer is disposed on an upper surface of the substrate, and the central axis is perpendicular to the upper surface of the substrate;
   the wavelength conversion layer is disposed on the reflection layer, the wavelength conversion layer is disposed around the central axis and has a complete annular shape or a partial annular shape, and the wavelength conversion layer comprises a first region and two second regions, and the first region is located between the two second regions; and
   the first optical layer is disposed on a surface of the wavelength conversion layer and corresponds to the first region, wherein an orthographic projection of the first optical layer on the upper surface of the substrate in an axial direction is not overlapped with an orthographic projection of the two second regions on the upper surface of the substrate in the axial direction, and the first optical layer comprises a plurality of first diffusing particles.

2. The wavelength conversion device of claim 1, further comprising two second optical layers disposed on the surface of the wavelength conversion layer and respectively corresponding to the two second regions, the first optical layer is located between the two second optical layers, an orthographic projection of the two second optical layers on the upper surface of the substrate in the axial direction is not overlapped with an orthographic projection of the first region on the upper surface of the substrate in the axial direction, and the two second optical layers comprise a plurality of second diffusing particles.

3. The wavelength conversion device of claim 2, wherein an average thickness of the first optical layer in the axial direction is the same as an average thickness of the two second optical layers in the axial direction, and a concentration of the plurality of first diffusing particles in the first optical layer is greater than a concentration of the plurality of second diffusing particles in the two second optical layers.

4. The wavelength conversion device of claim 3, wherein the concentration of the plurality of second diffusing particles in the two second optical layers is gradually reduced from adjacent to the first optical layer toward a direction away from the first optical layer.

5. The wavelength conversion device of claim 4, wherein the concentration of the plurality of second diffusing particles in the two second optical layers shows a gradient change or a continuous change.

6. The wavelength conversion device of claim 2, wherein an average thickness of the first optical layer in the axial direction is greater than an average thickness of the two second optical layers in the axial direction, and a concentration of the plurality of first diffusing particles in the first optical layer is the same as a concentration of the plurality of second diffusing particles in the two second optical layers.

7. The wavelength conversion device of claim 6, wherein the average thickness of the two second optical layers in the axial direction is gradually reduced from adjacent to the first optical layer toward a direction away from the first optical layer.

8. The wavelength conversion device of claim 7, wherein the average thickness of the two second optical layers in the axial direction shows a gradient change or a continuous change.

9. The wavelength conversion device of claim 1, wherein the reflection layer comprises a plurality of third diffusing particles, and a concentration of the plurality of third diffusing particles in the reflection layer is greater than a concentration of the plurality of first diffusing particles in the first optical layer.

10. The wavelength conversion device of claim 1, wherein an orthographic projection of the reflection layer on the upper surface of the substrate in the axial direction is overlapped with an orthographic projection of the first region and the two second regions on the upper surface of the substrate in the axial direction.

11. The wavelength conversion device of claim 1, wherein the reflection layer is a reflective coating on the substrate.

12. The wavelength conversion device of claim 1, wherein the wavelength conversion layer comprises a wavelength conversion material, and the wavelength conversion material in the first region is the same as the wavelength conversion material in the two second regions.

13. The wavelength conversion device of claim 1, wherein the wavelength conversion layer is used for receiving an excitation light beam, and the first region is overlapped with a region where the excitation light beam irradiates the wavelength conversion layer and an illuminance is greater than 50% of a maximum illuminance.

14. The wavelength conversion device of claim 1, wherein a length of the first region in a direction perpendicular to the axial direction is greater than 0.25 times and less than or equal to 0.5 times a length of the wavelength conversion layer in the direction perpendicular to the axial direction.

15. The wavelength conversion device of claim 1, wherein a concentration of the plurality of first diffusing particles in the first optical layer is less than 10% volume percent concentration.

16. The wavelength conversion device of claim 1, wherein a particle diameter of the plurality of first diffusing particles in the first optical layer is less than or equal to microns.

17. The wavelength conversion device of claim 1, wherein the first optical layer further comprises a first adhesive, the plurality of first diffusing particles are mixed in the first adhesive, the wavelength conversion layer comprises a second adhesive and a wavelength conversion material, the wavelength conversion material is mixed in the second adhesive, and the first adhesive is the same as the second adhesive.

18. A projection device, comprising an illumination system, at least one light valve, and a projection lens; wherein
the illumination system is used to provide an illumination light beam, and the illumination system comprises a wavelength conversion device comprising a substrate, a reflection layer, a wavelength conversion layer, and a first optical layer; wherein
the wavelength conversion device has a central axis and the reflection layer is disposed on an upper surface of the substrate, and the central axis is perpendicular to the upper surface of the substrate;
the wavelength conversion layer is disposed on the reflection layer, the wavelength conversion layer is disposed around the central axis and has an annular shape, the wavelength conversion layer comprises a first region and two second regions, and the first region is located between the two second regions; and
the first optical layer is disposed on a surface of the wavelength conversion layer and corresponds to the first region, wherein an orthographic projection of the first optical layer on the upper surface of the substrate in an axial direction is not overlapped with an orthographic projection of the two second regions on the upper surface of the substrate in the axial direction, and the first optical layer comprises a plurality of first diffusing particles;
the at least one light valve is disposed on a transmission path of the illumination light beam and used to convert the illumination light beam into an image light beam; and
the projection lens is disposed on a transmission path of the image light beam, and is used to project the image light beam out of the projection device.

19. The projection device of claim 18, wherein the wavelength conversion device further comprises two second optical layers disposed on the surface of the wavelength conversion layer and respectively corresponding to the two second regions, the first optical layer is located between the two second optical layers, an orthographic projection of the two second optical layers on the upper surface of the substrate in the axial direction is not overlapped with an orthographic projection of the first region on the upper surface of the substrate in the axial direction, and the two second optical layers comprise a plurality of second diffusing particles.

20. The projection device of claim 19, wherein an average thickness of the first optical layer in the axial direction is the same as an average thickness of the two second optical layers in the axial direction, and a concentration of the plurality of first diffusing particles in the first optical layer is greater than a concentration of the plurality of second diffusing particles in the two second optical layers.

21. The projection device of claim 20, wherein the concentration of the plurality of second diffusing particles in the two second optical layers is gradually reduced from adjacent to the first optical layer toward a direction away from the first optical layer.

22. The projection device of claim 21, wherein the concentration of the plurality of second diffusing particles in the two second optical layers shows a gradient change or a continuous change.

23. The projection device of claim 19, wherein an average thickness of the first optical layer in the axial direction is greater than an average thickness of the two second optical layers in the axial direction, and a concentration of the plurality of first diffusing particles in the first optical layer is the same as a concentration of the plurality of second diffusing particles in the two second optical layers.

24. The projection device of claim 23, wherein the average thickness of the two second optical layers in the axial direction is gradually reduced from adjacent to the first optical layer toward a direction away from the first optical layer.

25. The projection device of claim 24, wherein the average thickness of the two second optical layers in the axial direction shows a gradient change or a continuous change.

26. The projection device of claim 18, wherein the reflection layer comprises a plurality of third diffusing particles, and a concentration of the plurality of third diffusing particles in the reflection layer is greater than a concentration of the plurality of first diffusing particles in the first optical layer.

27. The projection device of claim 18, wherein an orthographic projection of the reflection layer on the upper surface of the substrate in the axial direction is overlapped with an orthographic projection of the first wavelength conversion region and the two second regions on the upper surface of the substrate in the axial direction.

28. The projection device of claim 18, wherein the illumination system comprises a plurality of light-emitting elements, the plurality of light-emitting elements are used to provide an excitation light beam, the wavelength conversion layer is used to receive the excitation light beam, and the first region is overlapped with a region where the excitation light beam irradiates the wavelength conversion layer and an illuminance is greater than 50% of a maximum illuminance.

29. The projection device of claim 18, wherein a length of the first region in a direction perpendicular to the axial direction is greater than 0.25 times and less than 0.5 times a length of the wavelength conversion layer in the direction perpendicular to the axial direction.

30. The projection device of claim 18, wherein a concentration of the plurality of first diffusing particles in the first optical layer is less than 10% volume percent concentration.

* * * * *